United States Patent
Watzke et al.

(10) Patent No.: US 11,423,002 B2
(45) Date of Patent: Aug. 23, 2022

(54) MULTILEVEL PARTITIONING OF OBJECTS

(71) Applicant: TERADATA US, INC., San Diego, CA (US)

(72) Inventors: Michael Warren Watzke, Fitchburg, WI (US); Bhashyam Ramesh, Secimderabad (IN)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 17/139,052

(22) Filed: Dec. 31, 2020

(65) Prior Publication Data
US 2022/0207014 A1 Jun. 30, 2022

(51) Int. Cl.
*G06F 16/22* (2019.01)
*G06F 16/2455* (2019.01)
*G06F 16/2453* (2019.01)
*G06F 16/27* (2019.01)

(52) U.S. Cl.
CPC ...... *G06F 16/2282* (2019.01); *G06F 16/2456* (2019.01); *G06F 16/24542* (2019.01); *G06F 16/24556* (2019.01); *G06F 16/278* (2019.01)

(58) Field of Classification Search
None
See application file for complete search history.

(56) References Cited

U.S. PATENT DOCUMENTS

| | | | |
|---|---|---|---|
| 6,144,983 A * | 11/2000 | Klots | G06F 9/52 707/999.008 |
| 10,706,052 B2 | 7/2020 | Ramesh et al. | |
| 10,713,255 B2 | 7/2020 | Ramesh et al. | |
| 2002/0194157 A1 * | 12/2002 | Zait | G06F 16/24557 |
| 2014/0280438 A1 * | 9/2014 | Shishkin | H04L 67/1097 709/201 |
| 2018/0081946 A1 * | 3/2018 | Bondalapati | G06F 16/24556 |
| 2020/0401320 A1 * | 12/2020 | Pyati | G06F 11/1458 |

OTHER PUBLICATIONS

Wikipedia, Microsoft Azure last edited Nov. 22, 2019 (8 pages).
Wikipedia, Google Storage last edited Nov. 2, 2019 (2 pages).
Wikipedia, Amazon S3 last edited Nov. 26, 2019 (8 pages).
Watzke et al., U.S. Appl. No. 16/720,389 entitled Assignment of Objects to Processing Engines for Efficient Database Operations filed Dec. 19, 2019 (32 pages).

* cited by examiner

*Primary Examiner* — Christopher J Raab
(74) *Attorney, Agent, or Firm* — Trop Pruner & Hu P.C.

(57) ABSTRACT

In some examples, a database system includes a plurality of processing engines to process data for database operations, and instructions executable on at least one processor to insert first data into first objects stored in a remote data store coupled to the database system over a network, and select, based on a size of the first data, a first partition level from a plurality of different partition levels to associate with the first objects. Different partition levels define different quantities of hash buckets that correspond to different distributions of objects across the plurality of processing engines. The first partition level is associated with the first objects.

20 Claims, 4 Drawing Sheets

MULTILEVEL PARTITIONING OF OBJECTS

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud that is accessible over a network, for example.

BRIEF DESCRIPTION OF THE DRAWINGS

Some implementations of the present disclosure are described with respect to the following figures.

Figure 1:
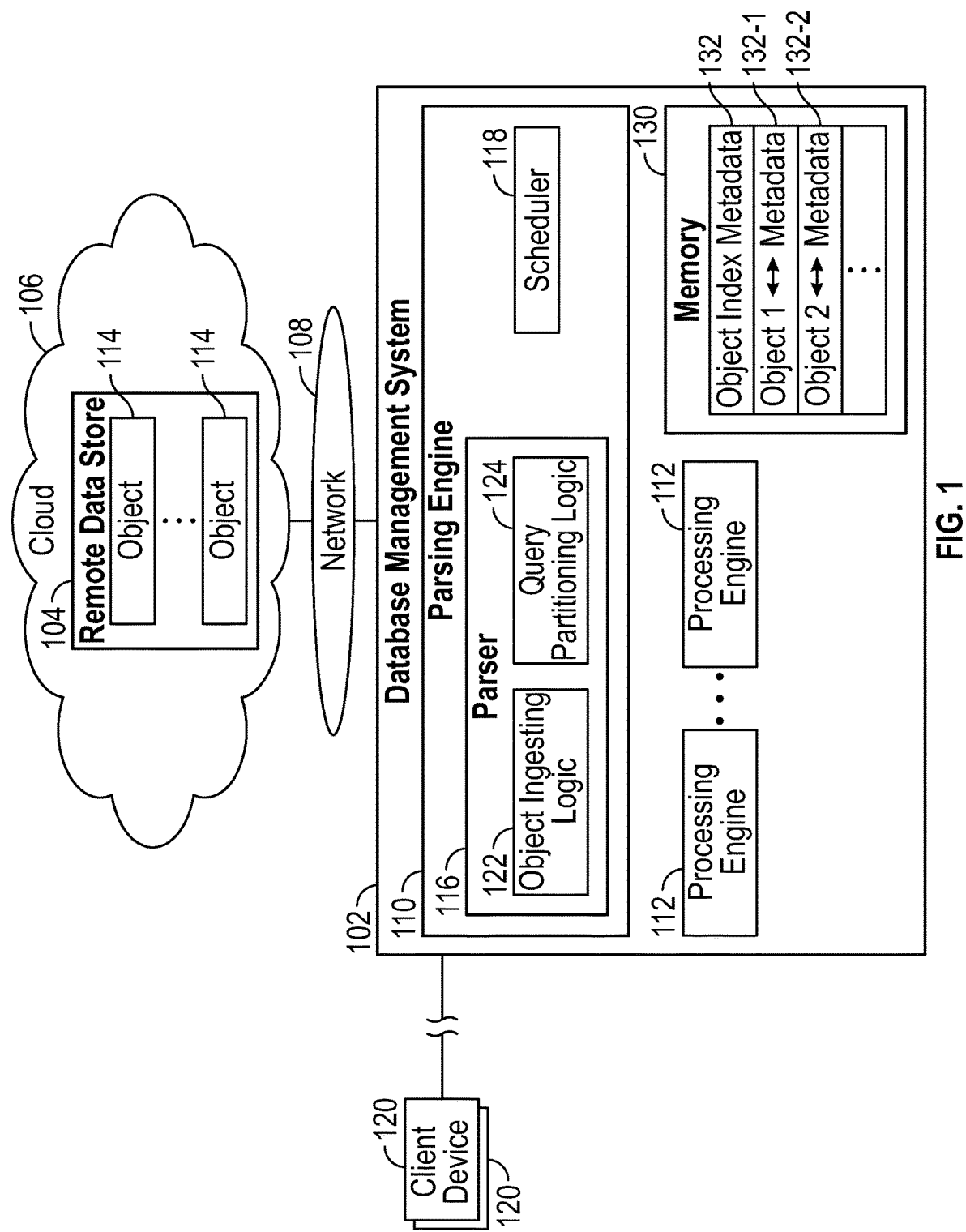
FIG. 1 is a block diagram of an example arrangement that includes a database management system and a logically disconnected remote data store, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

FIG. 1 is a block diagram of an example arrangement that includes a database management system (DBMS) 102 and a remote data store 104. In some examples, the remote data store 104 is an object store that stores objects 114. For example, an object store can be according to any of the following: Simple Storage Service (S3) from AMAZON WEB SERVICES (AWS), Google Cloud Storage, Microsoft AZURE, and so forth.

As used here, an "object" can refer to any separately identifiable or addressable unit of data.

In some examples, the remote data store 104 can be accessible in a cloud 106. A "cloud" can refer to any infrastructure, including computing, storage, and communication resources, that can be accessed remotely by user devices over a network, such as a network 108 shown in FIG. 1. Alternatively, the remote data store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

The DBMS 102 includes a parsing engine 110 that is able to process SQL queries, including data definition language (DDL) statements and data manipulation language (DML) statements.

In addition to the parsing engine 110, the DBMS 102 includes multiple processing engines 112.

As used here, an "engine" (e.g., the parsing engine 110 or a processing engine 112) can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The multiple processing engines 112 are able to execute in parallel with one another, and are able to access, in parallel, different data portions (e.g., different objects 114, different portions of objects 114) of the remote data store 104. Each processing engine 112 is considered a Unit of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to an operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

Traditionally, a DBMS stores data in relational databases stored in a block-based storage, in which data is stored as blocks that are smaller in size than objects of object stores. For example, a block-based storage can include disk-based storage devices, solid state storage devices, and so forth. The block-based storage can be connected to the DBMS over a relatively high-speed link, such that the DBMS can access (read or write) data in a relational database with relatively low input/output (I/O) latency (i.e., the delay between a time that a request is submitted and a time that the request is satisfied at the storage is relatively low). The block-based storage can be considered a local storage of the DBMS, since the DBMS is able to access the block-based storage with relatively low I/O latency.

In some examples, instead of or in addition to coupling block-based storage to the DBMS 102, the DBMS 102 can work with the remote data store 104, which can be provided in the cloud 106 or another remote computing environment. The objects 114 of the remote data store 104 can have variable sizes, and each object can have a size between 10 megabytes (MB) and 100 MB. In other examples, an object can have a smaller or larger size.

When responding to a SQL query, the DBMS 102 can access (write or read) data of the remote data store 104, rather than data in a relational table (or relational tables) of a local block-based storage. In some examples, accessing data of the remote data store 104 can have a higher I/O latency than accessing data of a local block-based storage. Note that the DBMS 102 can include caches to store a portion of the data for improving efficiency in data access. Data can be accessed from the caches of the DBMS 102 more quickly than data of the remote data store 104.

The arrangement according to FIG. 1 is according to a disconnected compute and storage architecture, in which a compute environment (including the DBMS 102) and a storage environment (including the remote data store 104) are logically disconnected from one another. Logical disconnection of the compute environment and the storage environment can refer to an arrangement in which data objects 114 (or other data portions) of the storage environment (including the remote data store 104) are not owned (assigned to) specific processing engines 112, but instead, the assignment of data objects 114 (or other data portions) of the storage environment to the processing engines 112 can change over time (such as from query to query). For example, to process a first query, a first object 114 may be assigned to a first processing engine 112, and a second object 114 may be assigned to a second processing engine 112. However, to process a second query, the first and second objects 114 may be assigned to the first processing engine 112, and other objects may be assigned to the second processing engine 112.

In a traditional DBMS that includes local storage, data stored in the local storage can be divided into multiple logical data subdivisions by hashing the data. The logical data subdivisions can be assigned to respective UOPs.

In the disconnected compute and storage architecture, using a hashing technique to create multiple logical data subdivisions assigned to respective UOPs may present various issues. First, if the number of logical data subdivisions is large, that may result in small objects 114 stored in the remote data store 104. A large number of small objects 114 in the remote data store 104 can result in storage fragmentation, which can be inefficient. Also, accessing small objects 114 in an object store may not be efficient, as object stores may be designed to employ larger objects. Another issue is that if there are too few logical data subdivisions, then processing skew may occur where one processing engine 112 has a larger workload than another processing engine 112 due to imbalance in the assignment of data portions to respective processing engines 112.

Also, in the disconnected compute and storage architecture, traditional techniques do not allow UOP local relational operations: join, aggregation etc. a UOP local relational operation refers to an operation, such as a join operation, performed at a given UOP (processing engine 112) where data for the operation are locally stored, such that redistribution of data across the UOPs does not have to be performed to support the operation.

In accordance with some implementations of the present disclosure, adaptive multilevel partitioning is used for a disconnected compute and storage architecture. The adaptive multilevel partitioning selectively employs different partition levels that define different quantities of hash buckets corresponding to different distributions of objects 114 across the plurality of processing engines 112.

For example, a first partition level defines a first quantity of hash buckets that map to respective processing engines 112. One or more objects in a first hash bucket are assigned to a first processing engine 112, one or more objects in a second hash bucket are assigned to a second processing engine 112, and so forth. Note that in some cases, multiple hash buckets can map to the same processing engine 112.

A second partition level defines a second quantity (different from the first quantity) of hash buckets that map to respective processing engines 112. There may be other partition level(s) that define(s) respective different quantity (quantities) of hash buckets.

A "hash bucket" is defined by a hash bucket value computed based on one or more attributes (also referred to as "columns") of a row (also referred to as a "tuple") of a table. A hash function is applied on the one or more attributes of the row, which produces a row hash. The most significant bits of the row hash can be used as the hash bucket value. A "hash function" refers to a function that takes as input value(s) of attribute(s) of a table row, and produces a number (a "row hash") as an output.

The different partition levels used in the adaptive multilevel partitioning according to some implementations of the present disclosure employ respective different portions of a row hash. For example, a first partition level uses the most significant 7 bits of a row hash as a hash bucket value, a second partition level uses the most significant 10 bits of a row hash as a hash bucket value, a third partition level uses the most significant 16 bits of a row hash as a hash bucket value, and so forth. Although specific quantities of bits of a row hash are listed for corresponding different partition levels, it is noted that in other examples, different quantities of bits of a row hash can be used for different partition levels.

A hash bucket value that is 7 bits in length can define up to 128 hash buckets. A hash bucket value that is 10 bits in length can define up to 1,024 hash buckets. A hash bucket value that is 16 bits in length can define up to 65,536 hash buckets.

The adaptive selection of partition levels from among different partition levels can occur in real-time (i.e., while the DBMS 102 is performing database operations) both during data ingesting and processing of database queries by the DBMS 102, as discussed in detail further below.

As further shown in FIG. 1, the parsing engine 110 of the DBMS 102 can include a parser 116 and a scheduler 118. The parser 116 or scheduler 118 can be part of the hardware processing circuit of the parsing engine 110, or can include machine-readable instructions executable on the parsing engine 110.

The parser 116 receives database queries (such as SQL queries, load requests, etc.) submitted by one or more client devices 120, which may be coupled to the DBMS 102 over an interconnect (e.g., the network 108 or another link). The parser 116 parses each received database query, and generates executable steps for the parsed query. The parser 116 includes an optimizer (not shown) that generates multiple query plans in response to a query. The optimizer selects the most efficient query plan from among the multiple query plans. Each query plan includes a sequence of executable steps to perform to process the database query. The scheduler 118 sends the executable steps of the selected query plan to respective processing engines 112.

Each processing engine 112 manages access (read or write) of data in respective objects 114 in the remote data store 104. Each processing engine 112 can perform the following tasks: inserts, deletes, or modifies contents of tables or other data records; creates, modifies, or deletes definitions of tables or other data records; retrieves information from definitions and tables or other data records; locks databases and tables or other data records; and so forth.

The parser 116 includes an object ingesting logic 122 and a query partitioning logic 124. Each of the object ingesting logic 122 and the query partitioning logic 124 can implement the adaptive multilevel partitioning according to some implementations of the present disclosure.

The object ingesting logic 122 and the query partitioning logic 124 can be part of the parser 116 or outside of the parser 116. Alternatively, the object ingesting logic 122 and the query partitioning logic 124 can be separate from the parsing engine 110.

Although shown as two different logic, the object ingesting logic 122 and the query partitioning logic 124 can be part of the same logic in other examples.

The object ingesting logic 122 controls the ingesting of data into the objects 114 of the remote data store 104, from one or more sources, which can include one or more client devices 120 or any other source. Ingesting of data into the objects 114 of the remote data store 104 can be responsive to a write operation, a load operation, or any other operation that causes data to be added to the remote data store 104.

For ingesting data into the remote data store 104, the object ingesting logic 122 selects a partition level of multiple partition levels (associated with using hash bucket values of different lengths as discussed above) for use in partitioning objects that receive the data across the processing engines 112. The partitioning level that is selected by the object ingesting logic 122 from among the different partition levels is based on a size of the data to be ingested. Examples of selection of a partition level from among multiple partition levels based on the size of ingested data are provided further below.

The actual ingesting of data into objects 114 of the remote data store 104 is performed by the processing engines 112, based on executable steps produced and deployed by the parsing engine 110.

In response to a database query received by the DBMS 102, the query partitioning logic 124 also applies adaptive multilevel partitioning to select a partition level from among a collection of partition levels to use for a database operation for the database query. For example, the database query can specify a database operation that involves one or more tables that can be stored in respective objects 114 associated with corresponding different partition levels. Data of any given table may be stored in more than one object 114 in the remote data store 104. In some cases, the objects containing the data of the given table may be associated with different partition levels. For example, data of the given table may be stored in: a first set of one or more objects associated with the first partition level, a second set of one or more objects associated with the second partition level, and so forth. As an example, data for a smaller table being created by the DBMS 102 may be stored in objects at less granular level(s) (e.g., the first partition level and/or the second partition level). As another example, data for a larger table being created by the DBMS 102 may be stored in objects at more granular level(s) (e.g., the second partition level and/or the third partition level). More generally, the DBMS 102 may create and store a table containing data inserted into objects associated with multiple partition levels of the different partition levels, where the multiple partition levels used depends on a size of the table.

The partition levels associated with the objects containing the data for the table(s) involved in the database operation of the database query make up a collection of partition levels from which a partition level is selected to use in the database operation. The query partitioning logic 124 selects a partition level from the collection of partition levels, based on a compute configuration of the DBMS 102. The "compute configuration" can include a quantity of the processing engines 112 that are available in the DBMS 102 to perform database operations. In some cases, the quantity of processing engines 112 can change over time for any of various different reasons.

In some examples, the query partitioning logic 124 can select a first partition level if the DBMS 102 includes a first quantity of processing engines 112, select a second partition level if the DBMS 102 includes a second quantity of processing engines 112, and so forth. More generally, given the quantity of processing engines 112 available in the DBMS 102, the query partitioning logic 124 selects the partition level that defines a quantity of hash buckets that satisfies one or more criteria, including a skew criterion and a loading criterion. The skew criterion relates to skew in the processing workload of processing engines 112, where skew can occur if one or more processing engines 112 performs more work than one or more other processing engines 112. For example, if there are 1,000 processing engines 112, and the first partition level that defines 128 hash buckets is selected, than the 128 hash buckets would be assigned to just 128 of the 1,000 processing engines, while the remaining processing engines will have no workload. This results in skew. The selection of a partition level seeks to reduce skew.

The loading criterion relates to how much load is being placed on each processing engine 112. The selection of a partition level seeks to reduce the amount of load placed on each processing engine 112. As an example, if there are 32 processing engines 112 available in the DBMS 102, and the third partition level is selected that defines 65,536 hash buckets, then a large load can be placed on each processing engine since a large number of hash buckets are mapped to each processing engine 112.

The query partitioning logic 124 assigns respective objects 114 (from the remote data store 104 over the network 108) containing data of the table(s) involved in the database operation specified by the database query to respective processing engines 112, based on hash bucket values according to the selected partition level. The processing engines 112 can retrieve the objects 114 and distribute the objects 114 accordingly.

In some examples, the objects may not store data records containing the rows of the table(s) in a relational table format. In such examples, as part of reading the rows of the objects, each processing engine 112 can convert the data records from the objects into the relational table format before processing of the database query. In other cases, the objects may store rows of the table(s) in the relational table format.

The DBMS 102 further includes a memory 130. A memory can be implemented using one or more memory devices. A memory device can include a volatile memory device, such as a dynamic random access memory (DRAM) device, a static random access memory (SRAM) device, and so forth. Alternatively, a memory device can include a nonvolatile memory device, such as a flash memory device, or any other type of nonvolatile memory device. Although shown as a single block, note that the memory 130 can be distributed as multiple memories in association with the processing engines 112.

The memory 130 can be used to store object index metadata 132, which stores metadata for respective objects 114 in the remote data store 104. In accordance with some implementations of the present disclosure, the metadata associated with an object can include information indicating a partition level associated with the object, and a hash bucket value associated with the object.

In FIG. 1, the object index metadata 132 includes multiple entries 132-1, 132-2, and so forth, where each entry 132-$i$ ($i$=1 to M with M representing the quantity of entries in the object index metadata 132) corresponds to metadata for a respective object. In some examples, the metadata for object 1 in the entry 132-1 contains an indication of the partition level associated with object 1 and the hash bucket value for object 1, the metadata for object 2 in the entry 132-2 contains an indication of the partition level associated with object 2 and the hash bucket value for object 2, and so forth.

The object index metadata 132 can be for a particular table, such as a table T1. A similar object index metadata can be stored in the memory 134 for other tables, such as tables T2, T3, etc.

Generally, data for any given table can be included in one object or multiple objects 114 in the remote data store 104.

For ingesting data into one or more objects 114 in the remote data store 104, the object ingesting logic 122 can update the object index metadata 132 with metadata associated with the one or more objects 114.

During database query processing, the query partitioning logic 124 is able to use hash bucket values in metadata in the object index metadata 132 for assigning objects across the processing engines 112.

Figure 2:
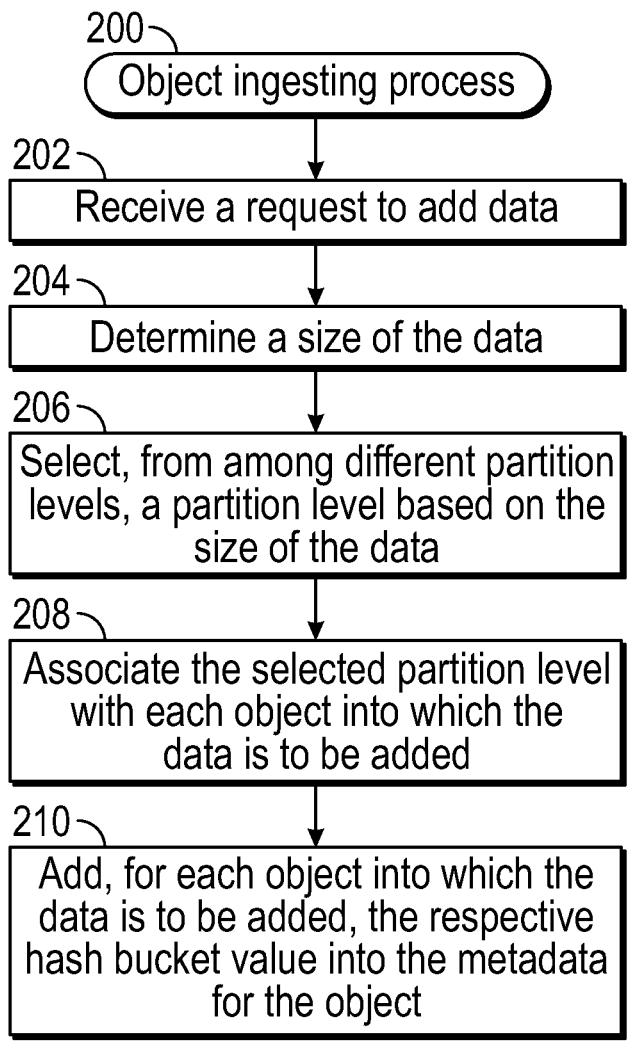
FIG. 2 is a flow diagram of a data ingesting process according to some implementations of the present disclosure.

FIG. 2 is a flow diagram of an object ingesting process 200 according to some examples. The object ingesting process 200 can be performed by the object ingesting logic 122 of FIG. 1, for example.

The object ingesting logic 122 receives (at 202) a request to add data to the remote data store 104. The request can include a write request, a load request, or any other request that can cause data to be added to the remote data store 104.

The object ingesting logic 122 determines (at 204) a size of the data to be added to the remote data store 104. For example, the data to be added can include a data volume, where a "data volume" can refer to any collection of data.

The object ingesting logic 122 selects (at 206), from among different partition levels, a partition level based on the determined size of the data to be added. Generally, the object ingesting logic 122 seeks to select a partition level that defines a quantity of hash buckets that more closely matches the quantity of objects into which the data is to be added. Note that it is acceptable to have more objects than hash buckets. For example, if 100,000 objects are inserted, then some of the 65,536 hash buckets of the third partition level would have one object and some would have 2 objects. The goal is to select the partition level (corresponding to 128, 1,024, or 65,536 hash buckets) based on the data volume.

The quantity of hash buckets defined by a given partition level "most closely" matches the quantity of objects into which the data is to be added if the quantity of hash buckets defined by the given partition level is closer to the quantity of objects into which the data is to be added than quantities of hash buckets defined by other partition levels.

Each object 114 in the remote data store 104 can have a specified size, such as 16 megabytes (MB) or another size. The data to be added can be inserted into N objects 114 of the specified size, where N depends upon the size of the data to be added. For example, if N is 130, then the first partition level (that uses a 7-bit hash bucket value) is selected by the object ingesting logic 122, since 130 is more closely matched to the 128 hash buckets that can be specified by the 7-bit hash bucket value. As another example, if N is equal to 1,200, then the second partition level (that uses a 10-bit hash bucket value) is selected by the object ingesting logic 122, since 1,200 is more closely matched to the 1,024 hash buckets that can be specified by the 10-bit hash bucket value. As a further example, if N is 64,000, then the third partition level (that uses a 16-bit hash bucket value) is selected by the object ingesting logic 122, since 64,000 is closer to the 65,536 hash buckets that can be specified by the 16-bit hash bucket value.

The object ingesting process 200 associates (at 208) the selected partition level with each object (of one or more objects) into which the data is to be added. The association can include updating the metadata for the corresponding object(s) in the object index metadata 132 to indicate the selected partition level.

The object ingesting logic 122 also adds (at 210), for each object into which the data is to be added, the respective hash bucket value into the metadata for the object in the object index metadata 132.

Note that the rows of an object are all associated with the same hash bucket value. If a hash bucket value is based on applying a hash function on attributes A and B of a table, then the rows that are part of a particular object would all have the same hash bucket value derived from applying the hash function on respective values of attributes A and B. Due to collisions, it is possible that multiple different values of A and B map to the same hash bucket value.

The table below shows an example of a sequence of inserts of data into a particular table.

| Sequence | Description |
| --- | --- |
| 1 | Insert 130 * 16 MB of data; select first partition level |
| 2 | Insert 1,200 * 16 MB of data; select second partition level |
| 3 | Insert 64,000 * 16 MB of data; select third partition level |
| 4 | Insert 140 * 16 MB of data; select first partition level |

For insert 1, the amount of data inserted is 13016 MB (assuming an object size of 16 MB). In this case, the first partition level is selected. For insert 2, the amount of data inserted is 1,200*16 MB, which causes selection of the second partition level. For insert 3, the amount of data inserted is 64,00016 MB, which causes selection of the third partition level. For insert 4, the amount of data inserted is 14016 MB, which causes selection of the first partition level.

From the foregoing, it can be seen that data of the particular table has been inserted into objects assigned to respective different partition levels.

Figure 3:
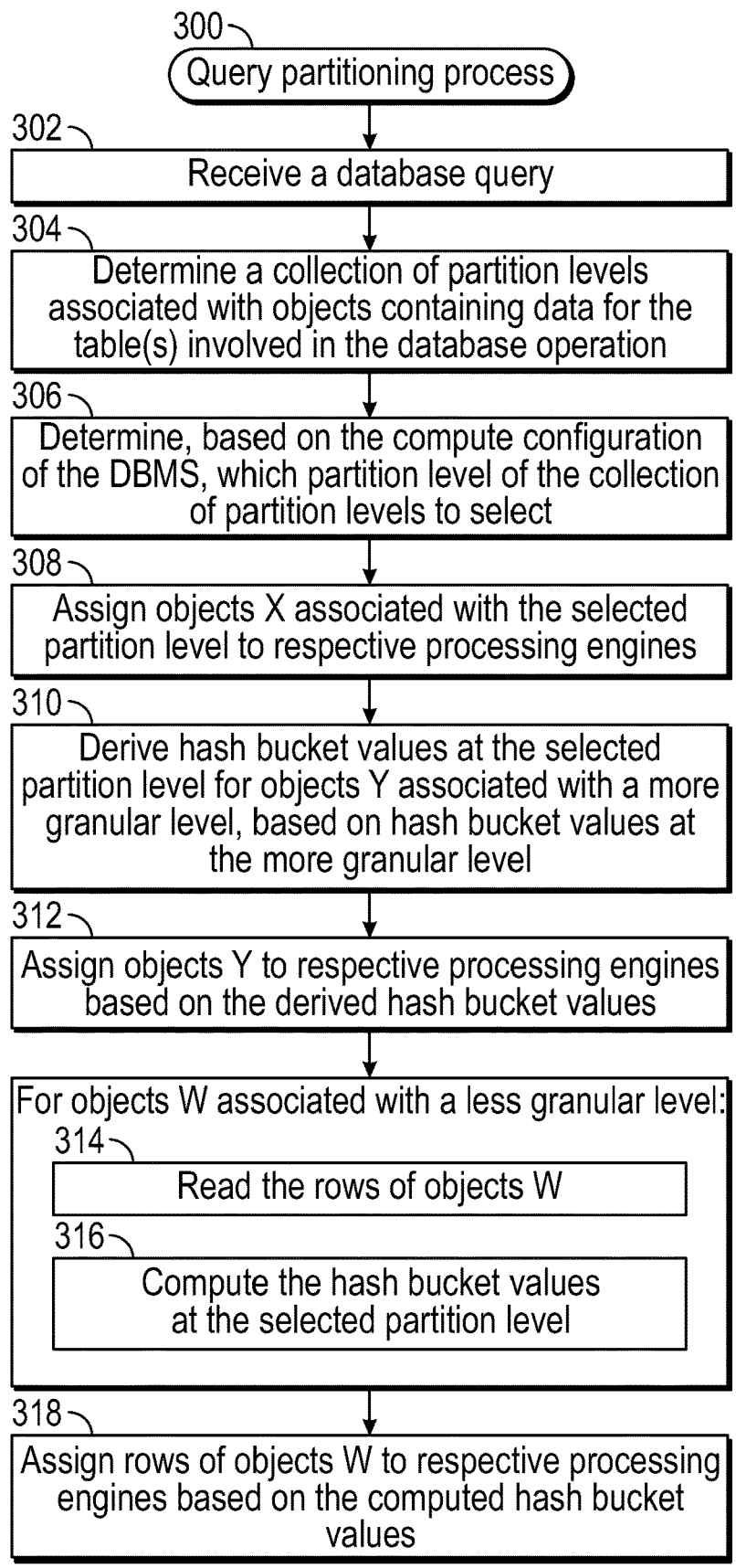
FIG. 3 is a flow diagram of a database query partitioning process according to some implementations of the present disclosure.

FIG. 3 is a flow diagram of a query partitioning process 300 performed by the query partitioning logic 124, according to some examples.

The query partitioning logic 124 receives (at 302) a database query that specifies a database operation (e.g., a join operation or another type of operation) involving one or more tables.

The query partitioning logic 124 determines (at 304) a collection of partition levels associated with objects containing data for the table(s) involved in the database operation. For example, for a join operation involving tables T1 and T2, the objects for table T1 may be associated with the first, second, and third partition levels, while the objects for table T2 may be associated with the first and second partition levels. In this case, the collection of partition levels is the union of the partition levels associated with the objects for tables T1 and T2.

The query partitioning logic 124 determines (at 306), based on the compute configuration of the DBMS 102, which partition level of the collection of partition levels to select. The compute configuration can include a quantity of processing engines 112 available in the DBMS 102 to perform the database operation.

The query partitioning logic 124 selects the partition level defining a quantity of hash buckets that satisfies one or more criteria (e.g., the skew criterion and/or the load criterion discussed further above) given the quantity of processing engines 112. For example, if there are 32 processing engines 112, then the first partition level (defining 128 hash buckets) would be selected by the query partitioning logic 124. If the first partition level is selected, then 4 hash buckets would be assigned to each of the 32 processing engines 112.

The query partitioning logic 124 assigns (at 308) the objects (referred to as "objects X") associated with the selected partition level to respective processing engines 112, based on hash bucket values for objects X. The hash bucket values for objects X can be retrieved from respective entries of one or more object index metadata for the table(s) involved in the database operation. Note that objects X contain data of the table(s) involved in the database operation specified by the database query.

There can be objects containing data of the table(s) associated with other partition levels different from the selected partition level. For example, if the selected partition level is the second partition level, then there can be objects (referred to as "objects W") that are associated with the first partition level, and objects (referred to as "objects Y") that are associated with the third partition level. Objects W and Y contain data of the table(s) involved in the database operation specified by the database query.

Objects W and Y cannot be distributed across the processing engines 112 using the hash bucket values in the object index metadata (stored in the memory 130) for objects W and Y, since these hash bucket values are not at the selected partition level (e.g., the second partition level).

In some examples of the present disclosure, the query partitioning logic 124 derives (at 310) hash bucket values at the selected partition level (e.g., the second partition level) for objects Y (associated with a more granular level, e.g., the third partition level), based on hash buckets for objects Y at the more granular level (the third partition level is more granular than the second partition level because the third partition level defines more hash buckets). The hash buckets for objects Y at the more granular level can be retrieved from the object index metadata (stored in the memory 130) for objects Y. Deriving hash bucket values at a less granular level from hash bucket values at a more granular level involves a division by a specified amount (e.g., hash bucket value P at the second partition level can be derived from hash bucket value Q at the third partition level by dividing P by a specified amount, such as by shifting Q by a few bits to derive P).

The query partitioning logic 124 assigns (at 312) objects Y to respective processing engines 112 based on the derived hash bucket values (as derived at 310).

For objects W associated with the less granular level (e.g., the first partition level) than the selected granular level (e.g., the second partition level), the query partitioning logic 124 reads (at 314) the rows of objects W and computes (at 316) the hash bucket values at the selected partition level for the rows by applying the hash function on the attribute(s) of the rows that are read. The first partition level is less granular than the second partition level because the first partition level defines less hash buckets than the second partition level.

The query partitioning logic 124 assigns (at 318) rows of objects W to respective processing engines 112 based on the computed hash bucket values (as computed at 316).

In some examples, the parsing engine 110 is able to perform a background reorganization operation to move objects associated with a less granular level to a more granular level (e.g., associate objects previously assigned the first partition level to the second partition level). This background reorganization operation includes computing hash bucket values at the more granular level for rows of the objects that are previously assigned hash bucket values at the less granular level. The foregoing repartitions rows of objects previously associated with the less granular level to objects at the more granular level.

In the foregoing examples, it is assumed that data being ingested has a size that results in the data being added to a quantity of objects that can be meaningfully partitioned across the processing engines 112 of the DBMS 102. In some cases, the ingested data may be small (e.g., the ingested data is added to just 2 objects 114). Assuming that the DBMS 102 has 32 processing engines 112, it may not make sense to assign the 2 objects to any of the partitioning levels discussed above. In such an example, the 2 objects can be assigned to an "unknown" partition level (i.e., none of the foregoing partition levels).

More generally, the object ingesting logic 122 receives a request to insert data into the remote data store 104, determines that a size of the data is insufficient for partitioning according to any of the different partition levels, and in response to the determining, assigns the data to one or more objects that are not associated with any partition level (e.g., the "unknown" partition level). For example, the size of the data is insufficient for partitioning according to any of the different partition levels if the size results in a quantity of objects that is less than the quantity of processing engines 112 by more than a threshold.

In some examples, when a database query is received that involves data in object(s) assigned the "unknown" partition level, the query partitioning logic 124 can read the rows of such object(s) assigned the "unknown" partition level, and compute hash bucket values for the rows at the selected partition level to use in distributing the rows across the processing engines 112.

Also, in some examples, a background reorganization operation can read rows of object(s) assigned the "unknown" partition level and compute hash bucket values at a given partition level.

Figure 4:
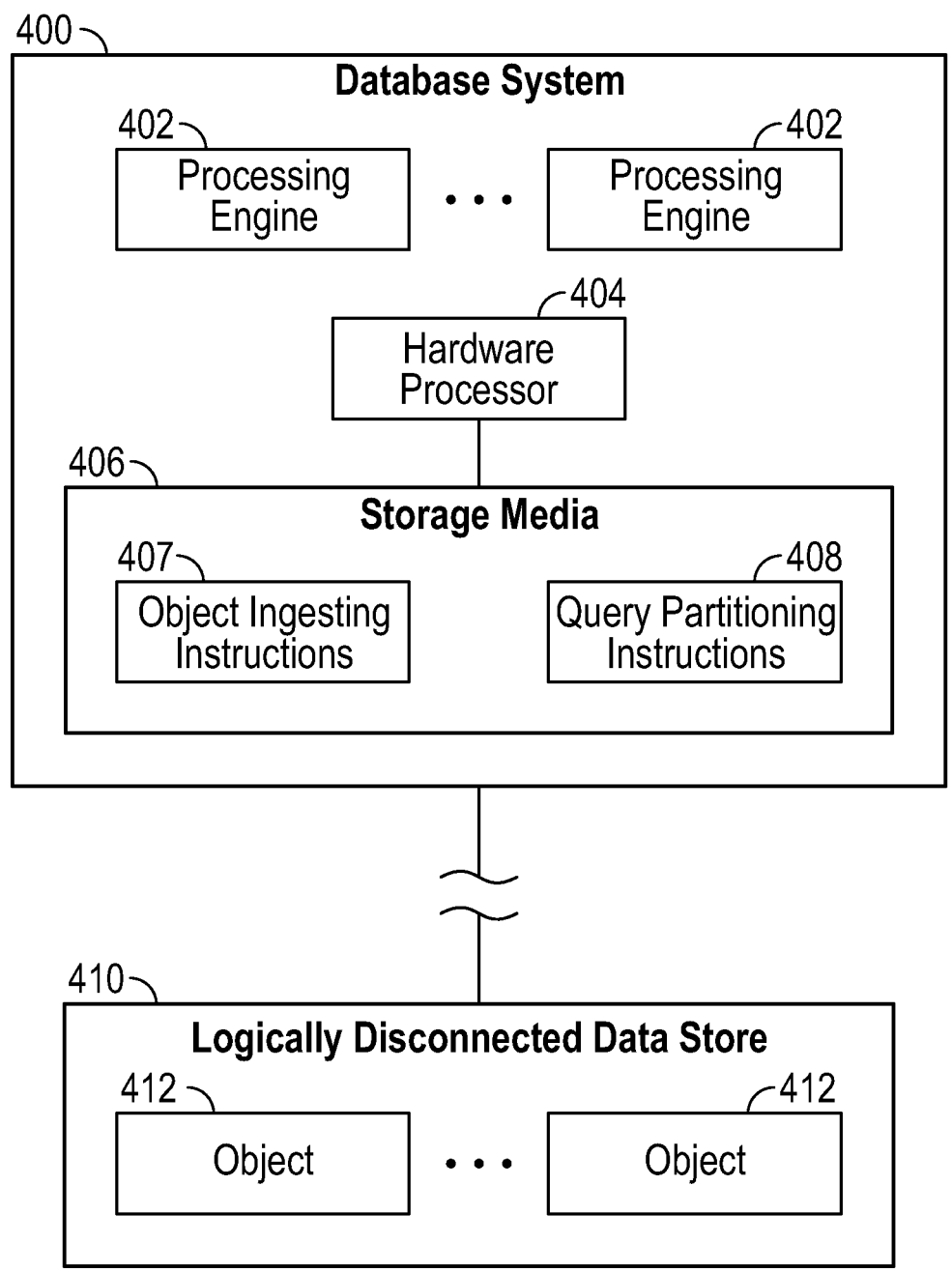
FIG. 4 is a block diagram of an example database system according to some implementations of the present disclosure.

FIG. 4 is a block diagram of an example database system 400, such as the DBMS 102 of FIG. 1, according to some implementations of the present disclosure.

The system 400 includes multiple processing engines 402 (similar to 112 in FIG. 1) to access data in a logically disconnected data store 410 (e.g., similar to 104 in FIG. 1). The logically disconnected data store 410 is part a disconnected compute and storage architecture as discussed above, and stores objects 422.

The system 400 includes one or more hardware processors 404. A hardware processor can include a microprocessor, a core of a multi-core microprocessor, a microcontroller, a programmable integrated circuit, a programmable gate array, or another hardware processing circuit.

The system 400 includes a non-transitory machine-readable or computer-readable storage medium 406 that stores machine-readable instructions executable on the one or more hardware processors 404 to perform respective tasks. The machine-readable instructions include object ingesting instructions 407, which can perform tasks of the object ingesting logic 122 of FIG. 1, for example. The machine-readable instructions include query partitioning instructions 408, which can perform tasks of the query partitioning logic 124 of FIG. 1, for example.

The storage medium 406 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A database system comprising:
a plurality of processing engines to process data for database operations;
at least one processor; and
a non-transitory storage medium comprising instructions executable on the at least one processor to:
insert first data into first objects stored in a remote data store coupled to the database system over a network, wherein the first data is part of a first table that further contains data in second objects stored in the remote data store, select, based on a size of the first data, a first partition level from a plurality of different partition levels to associate with the first objects, wherein the different partition levels define different quantities of hash buckets that correspond to different distributions of objects across the plurality of processing engines, and
associate the first partition level with the first objects, wherein the second objects are associated with a second partition level of the different partition levels; and
in response to a database query:
determine a quantity of the plurality of processing engines,
select, based on the determined quantity of the plurality of processing engines, which of the first partition level and the second partition level to use in a database operation for the database query,
select the first partition level to use in the database operation in response to determining a first quantity of the plurality of processing engines, and
select the second partition level to use in the database operation in response to determining a second quantity of the plurality of processing engines, wherein the second quantity is greater than the first quantity.

2. The database system of claim 1, further comprising a nonvolatile memory, wherein the instructions are executable on the at least one processor to:
include, in metadata stored in the nonvolatile memory, information indicating the first partition level for the first objects.

3. The database system of claim 2, wherein the information included in the metadata includes a hash bucket value for a given first object of the first objects, the hash bucket value determining to which processing engine of the plurality of processing engines the given first object is assigned.

4. The database system of claim 3, wherein rows of the given first object are each associated with the hash bucket value, the hash bucket value being based on applying a hash function on one or more attributes of the rows of the given first object.

5. The database system of claim 1, wherein a hash bucket is defined by a hash bucket value computed based on one or more attributes of a row of the first table, the first partition level uses a first portion of a row hash as the hash bucket value, and the second partition level uses a different second portion of the row hash as the hash bucket value.

6. The database system of claim 1, wherein the first partition level defines a smaller quantity of hash buckets than the second partition level.

7. The database system of claim 6, wherein if the first partition level is selected to use in the database operation, the instructions are executable on the at least one processor to:
derive hash bucket values at the first partition level based on hash bucket values at the second partition level, and
distribute the second objects according to the derived hash bucket values across the plurality of processing engines.

8. The database system of claim 7, wherein the hash bucket values at the second partition level are based on applying a hash function to one or more attributes of rows of the second objects.

9. The database system of claim 7, wherein the instructions are executable on the at least one processor to:
distribute, across the plurality of processing engines, the first objects according to hash bucket values stored in metadata for the first objects.

10. The database system of claim 6, wherein if the second partition level is selected to use in the database operation, the instructions are executable on the at least one processor to:
read rows of the first objects,
compute, for the rows of the first objects, hash bucket values at the second partition level, and
distribute, across the plurality of processing engines, the rows of the first objects according to the computed hash bucket values.

11. The database system of claim 1, wherein the database query is a join query to join a plurality of tables comprising the first table and a second table, and wherein the database operation is a join operation that joins rows of the first table and the second table that are distributed across the plurality of processing engines according to a selected partition level of the first partition level and the second partition level.

12. The database system of claim 1, wherein the instructions are executable on the at least one processor to:
select the first partition level to associate with the first objects based on one or more of a skew criterion or a loading criterion.

13. The database system of claim 1, wherein the instructions are executable on the at least one processor to:
in a background operation, repartition rows of the first objects associated the first partition level according to the second partition level.

14. The database system of claim 13, wherein the repartitioning of the rows of the first objects according to the second partition level comprises:
computing hash bucket values at the second partition level based on the rows of the first objects, and
assigning the rows to the second objects or to further second objects based on the computed hash bucket values at the second partition level.

15. The database system of claim 1, wherein the instructions are executable on the at least one processor to:
receive a request to insert second data into the remote data store,
determine that a size of the second data is insufficient for partitioning according to any of the different partition levels, and
in response to the determining, assign the second data to one or more objects that are not associated with any partition level.

16. The database system of claim 1, wherein the instructions are executable on the at least one processor to:
create and store a table containing data inserted into objects associated with multiple partition levels of the different partition levels, wherein the multiple partition levels used depends on a size of the table.

17. A non-transitory machine-readable storage medium comprising instructions that upon execution cause a database system to:
as part of ingesting first data into a remote data store coupled to the database system over a network:
select, based on a size of the first data, a first partition level from different partition levels to associate with first objects into which the first data is to be added, wherein the different partition levels define different quantities of hash buckets that correspond to different distributions of objects across a plurality of processing engines, and
store, in metadata for the first objects, information associating the first partition level with the first objects; and
in response to a database query for a database operation involving a table containing the first data:
determine, based on a compute configuration of the database system, whether to use the first partition level or a different partition level for the database operation,
use the first partition level for the database operation responsive to determining that a first quantity of hash buckets corresponding to the first partition level satisfies one or more criteria given a quantity of processing engines in the compute configuration, and
use the different partition level for the database operation responsive to determining that a different quantity of hash buckets corresponding to the different partition level satisfies the one or more criteria given the quantity of processing engines in the compute configuration.

18. The non-transitory machine-readable storage medium of claim 17, wherein the instructions upon execution cause the database system to:
when using the different partition level, derive hash bucket values at the different partition level based on hash bucket values at the first partition level included in the metadata for the first objects, and
distribute the first objects across the plurality of processing engines based on the derived hash bucket values.

19. A method of a database system comprising a hardware processor, comprising:
as part of ingesting first data into a remote data store coupled to the database system over a network:
selecting, based on a size of the first data, a first partition level from different partition levels to associate with first objects into which the first data is to be added, wherein the different partition levels define different quantities of hash buckets that correspond to different distributions of objects across a plurality of processing engines, and
store, in metadata for the first objects, information associating the first partition level with the first objects;
as part of ingesting second data into the remote data store:
selecting, based on a size of the second data, a second partition level from the different partition levels to associate with second objects into which the second data is to be added, and
store, in metadata for the second objects, information associating the second partition level with the second objects; and
in response to a database query for a database operation involving a table containing the first data:
determine, based on a compute configuration of the database system, whether to use the first partition level or the second partition level for the database operation,
use the first partition level for the database operation responsive to determining that a first quantity of hash buckets corresponding to the first partition level satisfies one or more criteria given a quantity of processing engines in the compute configuration, and
use the second partition level for the database operation responsive to determining that a different quantity of hash buckets corresponding to the different partition level satisfies the one or more criteria given the quantity of processing engines in the compute configuration.

20. The method of claim 19, comprising:
when using the second partition level, deriving hash bucket values at the second partition level based on hash bucket values at the first partition level included in the metadata for the first objects, and
distribute the first objects across the plurality of processing engines based on the derived hash bucket values.

* * * * *